(12) United States Patent
Funayama et al.

(10) Patent No.: US 6,636,390 B2
(45) Date of Patent: Oct. 21, 2003

(54) MAGNETIC HEAD AND MAGNETIC RECORDING AND REPRODUCING SYSTEM

(75) Inventors: Tomomi Funayama, Fujisawa (JP);
Masatoshi Yoshikawa, Yokohama (JP);
Takashi Koizumi, Kawasaki (JP); Akio Hori, Kawasaki (JP); Yuichi Osawa, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 250 days.

(21) Appl. No.: 09/801,698

(22) Filed: Mar. 9, 2001

(65) Prior Publication Data

US 2001/0022712 A1 Sep. 20, 2001

(30) Foreign Application Priority Data

Mar. 14, 2000 (JP) .......................... 2000-070265

(51) Int. Cl.$^7$ .................... G11B 5/187; G11B 5/127; G11B 5/193; G11B 5/133; G11B 5/39
(52) U.S. Cl. .................... 360/317; 360/127; 360/121
(58) Field of Search ................ 360/317, 126, 360/125, 121, 122, 127

(56) References Cited

U.S. PATENT DOCUMENTS

| | | | |
|---|---|---|---|
| 4,652,945 A | * 3/1987 | Marchant ............... | 360/77.01 |
| 5,057,957 A | * 10/1991 | Ito et al. ............... | 360/123 |
| 5,739,990 A | * 4/1998 | Ravipati et al. ......... | 390/324.12 |

FOREIGN PATENT DOCUMENTS

| | | | | |
|---|---|---|---|---|
| EP | 0 725 386 A2 | 8/1996 | | |
| EP | 0 917 134 A2 | 5/1999 | | |
| JP | 62172515 A | * 7/1987 | ............ | G11B/5/39 |
| JP | 63241702 A | * 10/1988 | ............ | G11B/5/02 |
| JP | 06162437 A | * 6/1994 | ........... | G11B/5/265 |
| JP | 06223320 A | * 8/1994 | ........... | G11B/5/265 |
| JP | 08-221718 | 8/1996 | | |
| JP | 11-120509 | 4/1999 | | |
| JP | 11250424 A | * 9/1999 | ............ | G11B/5/39 |

OTHER PUBLICATIONS

Patent Abstracts of Japan, vol. 1997, No. 6, Jun. 30, 1997 & JP 09 035213 A (Hitachi Ltd.), Feb. 7, 1997, abstract.
Patent Abstracts of Japan, vol. 1999, No. 01, Jan. 29, 1999 & JP 10 283617 A (Minebea Co. Ltd.), Oct. 23, 1998, abstract.
Patent Abstracts of Japan, vol. 1999, No. 5, May 31, 1999 & JP 11 039619 A (Hitachi Ltd.), Feb. 12, 1999, abstract.
Patent Abstracts of Japan, vol. 2000, No. 02, Feb. 29, 2000 & JP 11 316920 A (Yamaha Corp.), Nov. 16, 1999, abstract.

* cited by examiner

*Primary Examiner*—William Klimowicz
(74) *Attorney, Agent, or Firm*—Foley & Lardner

(57) ABSTRACT

A magnetic head for vertical magnetic. The magnetic head includes: a recording head including a first main pole and a first return yoke, the first main pole having a first medium facing portion, the first return yoke having a second medium facing portion, and a reproducing head including a second main pole and a second return yoke, the second main pole having a third medium facing portion, the second return yoke having a fourth medium facing portion, first angle $\theta 1$ between first and second straight lines being smaller than second angle $\theta 2$ between the first straight line and third straight line, the first straight line connecting centers of medium facing surfaces the first medium facing portion and the second medium facing portion, the second straight line connecting opposing corners of medium facing surfaces of the first medium facing portion and the second medium facing portion, and the third straight line connecting centers of medium facing surfaces of the third medium facing portion and the fourth medium facing portion.

19 Claims, 9 Drawing Sheets

DURING RECORDING

DURING REPRODUCTION

MAGNETIC HEAD AND MAGNETIC RECORDING AND REPRODUCING SYSTEM

CROSS REFERENCE TO RELATED APPLICATION

This application claims benefit of priority under 35USC §119 to Japanese Patent Application No. 2000-70265, filed on Mar. 14, 2000, the contents of which are incorporated by reference herein.

BACKGROUND OF THE INVENTION

1. Field of the Invention

The present invention relates generally to a magnetic head and a magnetic recording and reproducing system. More specifically, the invention relates to a recording and reproducing magnetic head capable of carrying out an effective recording and reproducing with low noises in a vertical magnetic recording system, and a recording and reproducing system using the same.

2. Description of Related Art

In recent years, magnetic recording systems, such as hard disk drives (HDDs), are rapidly miniaturized and densified, and expected to be further densified in future. In order to increase the density in magnetic recording, it is required to narrow the recording track width to enhance the recording track density, and it is required to enhance the recording density in longitudinal directions of the recording track, i.e., the "track recording density".

However, in a so-called inplane recording system (longitudinal recording system), as the recording density increases, there are remarkably caused problems in that the diamagnetic field increases, the regenerative output decreases, and stable recording operations can not be carried out. As a system for eliminating these problems, the vertical recording system is proposed. The vertical recording system is designed to magnetize in directions substantially perpendicular to the surface of a recording medium to record signals, and has advantages in that even if the recording density increases, the influence of the diamagnetic field is small and the lowering of the regenerative output is suppressed as compared with the inplane recording system.

In either of the inplane recording system or the vertical recording system, an inductive head is conventionally used for reproducing signals which have been recorded on medium. However, the anisotropic magnetoresistive (AMR) head, which uses the magnetoresistance effect and which has a high regenerative sensitivity, is developed to be used as a shielded reproducing head so that a sufficient regenerative signal output can be obtained even if the recording track width becomes narrower and the magnitude of recorded magnetization decreases with the increase of density. In recent years, the spin-valve-type GMR head utilizing the giant magnetoresistance effect is used. Moreover, a magnetic head using the tunneling magnetoresistance effect (TMR), which is expected to have a higher regenerative sensitivity, is developed and studied for practical use. Thus, magnetic heads having a high regenerative sensitivity have been developed. By using these magnetic heads, a recording signal begins to be able to be recorded even if it has a very small recording bit size.

By the way, in order to enhance the track recording density which is the density in longitudinal directions of a recording track, it is required to narrow the gap of a magnetic head. However, in the above-described conventional magnetic heads using the magnetoresistance effect, a magnetoresistance effect element is provided in a head gap. Even in the case of the AMR head or the spin-valve GMR head, the thickness of the magnetoresistance effect element must be about 30 nm, and 100 nm between shields in view of insulation from shields. For that reason, in the conventional type of magnetic heads, the thickness of the magnetoresistance effect element capable of narrowing the head gap is limited to about 100 nm. Therefore, there is a severe limit to the enhancement of track recording density.

Accordingly, it is desired to provide a magnetoresistance effect type magnetic head of a type capable of sufficiently narrowing a head gap without providing a magnetoresistance effect element in the gap of a magnetic head, for incorporating a magnetic flux from recorded magnetization by means of a head gap portion to guide the magnetic flux into the magnetic head by means of a magnetic yoke to transmit a magnetoresistance effect element which is arranged in the rear portion of the magnetic head, i.e., a magnetoresistance effect type magnetic head of "yoke type". Since this yoke type magnetic head can sufficiently decrease the head gap, it is expected that the yoke type magnetic head can improve the resolution in reproduction and can correspond to a high track recording density. With respect to the track density, although a conventional type magnetic head defines a regenerative track width by intervals of leads which are provided for supplying a sense current to both ends of a magnetoresistance effect element, the yoke type magnetic head can define a track width by the thickness of a yoke film, so that the yoke type magnetic head can more easily narrow the track width than the conventional type magnetic head. From these facts, it is expected that the yoke type magnetic head can particularly sufficiently adapt to the enhancement of recording density in future.

On the other hand, it is also required to provide a recording head for writing in order to construct a magnetic head for HDD. Although there is the same advantage in a recording head in the case of a planar type head capable of a track width by a thickness, it is very difficult to provide this recording head with a coil for generating a magnetomotive force. Although it is required to provide the coil so as to pass above and below a magnetic pole, the process for producing the coil is not only complicated, but it is also not easy to increase the turn number of the coil. In order to eliminate these problems, the coil may be prepared in the plane of a substrate. However, in this case, a reproducing head must be prepared on the side of the substrate, so that the process is more complicated.

Particularly in the case of the vertical recording system, there is proposed a recording medium disk having a double-layer film structure wherein a "magnetically soft backing layer" is provided below a magnetizing recording layer in order to enhance recording and reproducing efficiencies. Using such a medium, the demagnetization field at the tip of the magnetic head can be reduced by the magnetic interaction between the magnetic head and the magnetically soft backing layer. Therefore, a greater generated magnetic field can be obtained during a recording operation, and a greater regenerative signal can be obtained during a reproducing operation.

However, in such a vertical magnetic recording system using the double-layer recording medium having the magnetically soft backing layer, there is a problem in that noises are generated due to the magnetically soft backing layer. These noises are generated by the variation in magnetized state of the magnetically soft backing layer. Typical noises are Barkhausen noises caused by the movement of magnetic domain walls.

Since a relatively strong magnetic flux passes through the backing layer during a recording operation, the magnetized state at that place is disturbed to cause the generation of noises during a reproducing operation. In particular, when the recording density is high and when a sensitive magnetoresistance effect element is used as a reproducing head, the recording bit size is small, so that the quantity of magnetic fluxes generated by the recording layer is small. Therefore, there are problems in that the influence of noises increases, so that S/N decreases during a reproducing operation.

By the residual magnetization of a recording pole, a magnetic circuit is always formed by the main pole of the recording head, the magnetically soft backing layer and a return yoke although it has a smaller magnetic field than that during a recording operation. During a recording operation, there is no problem since a stronger magnetic field is generated. However, during a reproducing operation, the source of magnetomotive force only has recording bits of the recording layer. In particular, as the recording density increases, the bit size decreases, so that the generated magnetic fluxes decrease. Therefore, the influence of residual magnetization of the recording pole becomes remarkable, so that the reproducing efficiency is caused to decrease.

SUMMARY OF THE INVENTION

It is therefore an object of the present invention to eliminate the aforementioned problems and to provide a magnetic head for vertical magnetic recording, which can suppress noises due to a magnetically soft layer and which can improve the lowering of efficiency, and a magnetic recording and reproducing system using the same.

In order to accomplish the aforementioned and other objects, there is provided a magnetic head comprising: a recording head comprising a first main pole and a first return yoke, the first main pole having a first medium facing portion, the first return yoke having a second medium facing portion, the first and second medium facing portions are disposed with first magnetic gap therebetween, a reproducing head comprising a second main pole and a second return yoke, the second main pole having a third medium facing portion, the second return yoke having a fourth medium facing portion, the third and fourth medium facing portions are disposed with second magnetic gap therebetween, first angle $\theta1$ between first and second straight lines being smaller than second angle $\theta2$ between the first straight line and third straight line, the first straight line connecting centers of medium facing surfaces of the first medium facing portion and the second medium facing portion, the second straight line connecting opposing corners of medium facing surfaces of the first medium facing portion and the second medium facing portion, and the third straight line connecting centers of medium facing surfaces of the third medium facing portion and the fourth medium facing portion.

The "main pole" of the magnetic head is a portion for recording on a medium in a predetermined track width using magnetic fluxes which are generated by passing current through a coil. The "return yoke" of the recording head is provided for forming a magnetic circuit, and usually has a wider area on the medium facing surface than the main pole.

The "main pole" and "return yoke" of the reproducing head are basically the same as those of the recording head. However, the "main pole" and the "return yoke" often substantially have the same shape, so that they are often expressed by "yokes". In such cases, for convenience, one of them is interpreted as the main pole, and the other is interpreted as the return yoke, so that the above described definition is used.

When the reproducing head is a shielded reproducing head, a magnetoresistance effect element itself corresponds to the main pole, and a shield corresponds to the return yoke.

If a magnetic head according to the present invention is used for recording on a vertical magnetic recording medium comprising a magnetically soft backing layer and a vertical recording layer, magnetic fluxes flow through a range of $\pm\theta1$ with respect to the line drawn between the centers of the main pole and return yoke of the recording head of the magnetically soft backing layer. Then, this place is read out by the reproducing head, the direction of magnetic fluxes flowing through the magnetically soft backing layer during the reproducing operation is not coincident with the direction of magnetic fluxes flowing through the magnetically soft backing layer during the recording operation.

As a result, it is possible to eliminate problems in that Barkhausen noises are generated and the reproducing efficiency is lowered when both directions are coincident with each other.

If the magnetic head according to the present invention is constructed so that the $\theta2$ is substantially 90°, the magnetoresistance effect element serving as an important portion of the reproducing head, and the large complicated-shaped recording head exciting coil can be formed on the same plane, specifically on the plane of the substrate. Therefore, the producing process can not only be simplified, but it is also possible to further suppress Barkhausen noises since magnetic fluxes flow in pseudo directions, in which magnetization is difficult, when a reproducing operation is carried out so that magnetic fluxes flow in directions perpendicular to the direction of magnetic fluxes having flowed during a recording operation.

If the magnetic head is constructed so that the line drawn between the center of the main pole of the reproducing head and the center of the return yoke of the reproducing head is substantially parallel to the longitudinal directions of a recording track which is formed on a recording medium, the efficiency during a reproducing operation can be enhanced for the following reasons.

That is, during a recording operation, the bit size is determined by the shape of the main pole, the rotating speed of the medium disk and the frequency of writing current. The recording efficiency does not so depend on the directions of the line, which is drawn between the center of the main pole and the center of the return yoke, with respect to the track directions, and the directions of the line may be the directions of the track width. This can be accomplished if the sufficient quantity of magnetic fluxes can be supplied from the coil and the shape of the main pole is optimized. On the other hand, during a reproducing operation, resolution can be defined by determining the shape in accordance with the recorded bit size. However, since the track width is generally greater than the bit length, the size can be minimum when the line drawn between the center of the main pole and the center of the return yoke extends in the longitudinal directions of the track, i.e., the directions of the bit length.

As the recording density increases, the bit size decreases, and the quantity of generated magnetic fluxes decreases. Therefore, in order to increase the reproducing efficiency, it is desired that the distance between the main pole and the return yoke is as small as possible. If the line drawn between the center of the main pole and the center of the return yoke extends in the longitudinal directions of the track, both of the definition of resolution and the increase of the efficiency can be achieved.

In addition, if the main pole of the recording head also serves as the main pole of the reproducing head, it is possible to avoid the shift of the position of the recording track from the position of the reproducing track, so that it is possible to provide a very advantageous structure for increasing the recording density. If the main poles of the recording head and reproducing head are separately arranged, the shift between the track positions of the recording head and reproducing head if the skew angle varies. In order to avoid this, the recording track width is set to be wider than the reproducing track width so that there is no problem even if the skew angle varies. In that case, in order to increase the recording density, there is a problem in that the track width must be finally widened.

Therefore, if the recording main pole is the same as the reproducing main pole, the track position is not shifted even if the skew angle varies, so that it is not required to widen the recording track. As a result, since the minimum track width can be used, the track density increases, so that the recording density is improved.

The magnetic recording and reproducing system of the vertical magnetic recording system according to the present invention has any one of the above described magnetic heads according to the present invention. In particular, if the system is combined with the vertical double-layer medium using the magnetically soft backing layer, it is possible to realize excellent recording/reproducing characteristics.

This magnetic recording and reproducing system comprises: a slider on which any one of the above described magnetic heads is formed; a suspension for supporting the slider and for suitably holding the distance between a medium and the slider; a driving part for positioning the head; a medium disk; and a driving part for rotating the medium disk.

In a recording operation using this magnetic recording and/or reproducing system, current is passed through the coil of the recording head to generate magnetic fluxes which are focused on the main pole to write on the medium disk. At this time, the magnetic fluxes passing through the recording layer pass through the magnetically soft backing layer to return to the return yoke to form a magnetic circuit, so that the recording efficiency is improved. In a reproducing operation, magnetic fluxes from the recording bit, which has been recorded, are sucked into the main pole of the reproducing head to pass through the magnetoresistance effect element serving as a sensor, the return yoke and the backing layer to return to the recording bit to form a magnetic circuit, so that it is possible to efficiently carry out the reproducing operation. A regenerative signal is detected as the variation in resistance when a magnetic flux passes through the magnetoresistance effect element.

Moreover, if the stacked film comprising the antiferromagnetic film and the magnetically soft film is used as the magnetically soft backing layer, it is possible to provide a more excellent magnetic recording and/or reproducing system. If this is combined with the magnetic head according to the present invention, the direction of magnetic fluxes flowing through the magnetically soft backing layer during the recording operation is different from that during the reproducing operation. If the magnetically soft backing has a magnetic anisotropy, the magnetic permeability varies in accordance with direction, so that the efficiency drops during any one of recording and reproducing operations. If a magnetic domain wall is produced on the magnetically soft backing layer, noises are generated when the magnetic head pass through the magnetic domain wall. Also, if the magnetic domain wall of the magnetically soft backing layer is moved by a disturbance magnetic field generated from a head positioning or disk rotating motor, noises are generated. Therefore, it is desired to provide a film which is a magnetically isotropic film wherein no magnetic domain wall is produced on the magnetically soft backing layer. For that reason, if the stacked film comprising the antiferromagnetic film and the magnetically soft film is used as the backing layer, the generation of magnetic domain walls can be suppressed by the switched connection between the antiferromagnetic film and the magnetically soft film, and the backing layer can be a magnetically isotropic film. It is possible to obtain a film having such characteristics by applying a rotating magnetic field during the deposition of the antiferromagnetic film and magnetically soft film or by carrying out a thermal treatment in a rotating magnetic field after the deposition. Therefore, the magnetic recording and/or reproducing system, wherein the magnetic head according to the present invention is combined with the vertical double-layer medium using an antiferromagnetic film and the magnetically soft film as the backing layer, is an excellent magnetic recording and/or reproducing system wherein the influence of noises is suppressed even if the recording density increases.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described in detail below.

(First Preferred Embodiment)

First, as the first preferred embodiment of the present invention, the basic relationship between the arrangements of a recording head and a reproducing head will be described.

Figure 1:
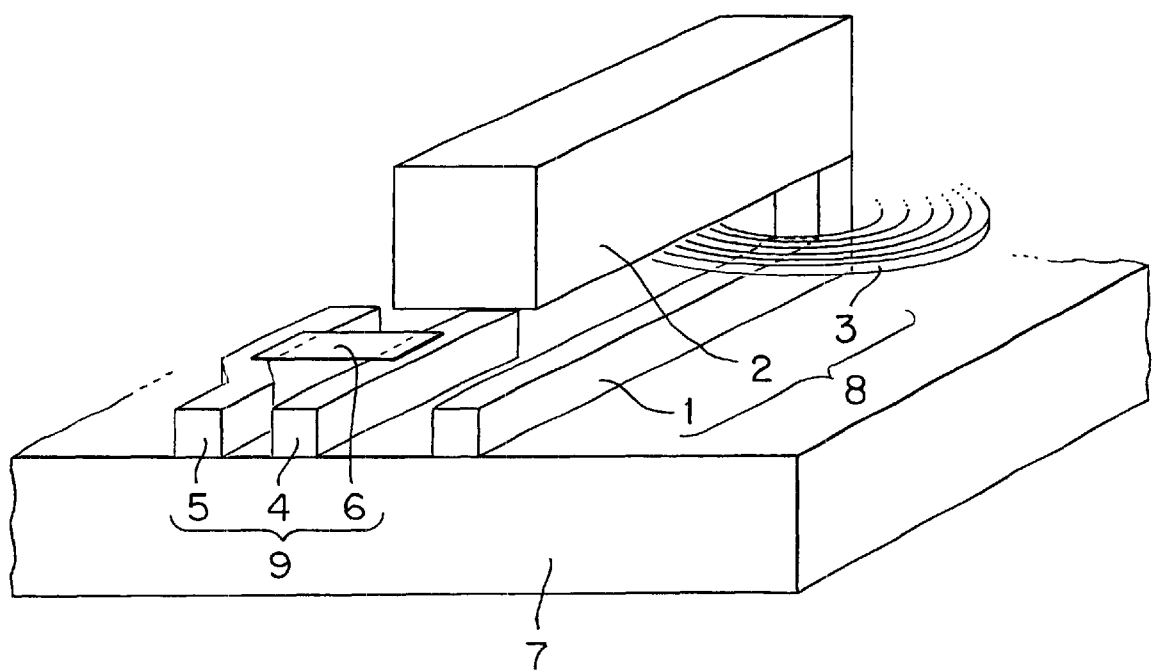
FIG. 1 is a perspective view showing the schematic construction of the first preferred embodiment of a magnetic head for vertical magnetic recording according to the present invention.

FIG. 1 is a conceptual drawing showing the principal construction of a magnetic head for vertical magnetic recording according to the present invention. That is, this figure is a perspective view of a magnetic head viewed from a medium facing surface, and shows a recording head 8 and a reproducing head 9 which are formed on an alutic ($Al_2O_3$/TiC) substrate 7 coated with alumina.

The recording head 8 comprises a recording main pole 1 of a magnetic material such as NiFe, an exciting coil 3 of a conductive material such as Cu, and a return yoke 2 of a magnetic material such as NiFe, which is connected to the recording main pole 1 via a magnetic path hole.

The reproducing head 9 comprises a reproducing main pole 4 of a magnetic material such as NiFe, a reproducing return yoke 5, a magnetoresistance effect element 6 which is arranged so as to construct a bridge therebetween, and leads (not shown in this figure) of a conductive material such as Cu, which are arranged on both sides of the magnetoresistance effect element 6 in order to supply a sense current to the magnetoresistance effect element 6.

Figure 2:
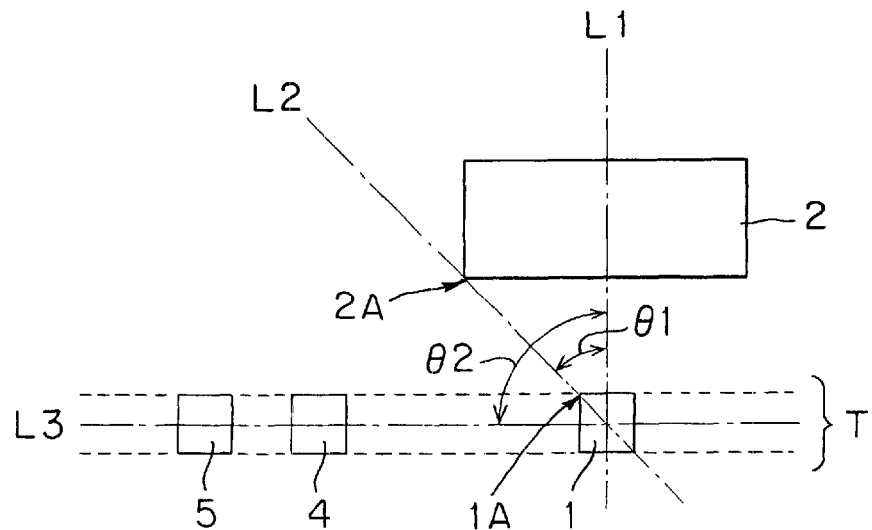
FIG. 2 is a plan view for explaining the positional relationship between a recording head and a reproducing head in the first preferred embodiment of a vertical head for vertical magnetic recording according to the present invention.

FIG. 2 is a plan view showing the positional relationship between the recording head 8 and the reproducing head 9, which is viewed from the side of a medium facing surface. As shown in this figure, the main pole 1 of the recording head, and the main pole 4 and return yoke 5 of the reproducing head are arranged along a recording track T.

It is herein assumed that a line drawn between the center of the main pole 1 of the recording head 8 and the center of the return yoke 2 is L1. It is also assumed that a line drawn between the facing end portions 1A and 2A of the main pole 1 and return yoke 2 is L2. It is also assumed that an angle between the lines L1 and L2 is $\theta 1$.

On the other hand, it is assumed that a line drawn between the center of the main pole 4 of the reproducing head 9 and the center of the return yoke 5 is L3, and it is assumed that an angle between the lines L1 and L3 is $\theta 2$.

If the lines and angles are thus defined, the magnetic head according to the present invention is constructed so that $\theta 2 > \theta 1$.

If this head is used for recording on a vertical magnetic recording medium comprising a magnetically soft backing layer and a vertical recording layer, magnetic fluxes flow through the magnetically soft backing layer in a range of $\pm \theta 1$ with respect to the line drawn between the main pole of the recording head and the return yoke. Then, if readout is carried out at this recorded place by means of the reproducing head, the direction of magnetic fluxes flowing through the magnetically soft backing layer during this readout is not coincident with the direction of the magnetic fluxes flowing during the recording operation. If both directions are coincident with each other, the direction of the magnetic fluxes flowing during the recording operation is a pseudo easily magnetized direction, and the coercive force in that direction increases, so that there is a problem in that Barkhausen noises are easily generated. In particular, during the recording operation, stronger magnetic fluxes flow than those during the reproducing operation, so that the magnetically soft backing layer approaches magnetic saturation. Since the magnetic permeability in the direction magnetized approximately to saturation once generally decreases, efficiency decreases due to the low magnetic permeability if magnetic fluxes flow in that direction.

On the other hand, in the magnetic head according to the present invention, the direction of magnetic fluxes during a recording operation can be shifted from that during a reproducing operation by limiting the relationship between the arrangements of the recording head and the reproducing head to the above described range. As a result, it is possible to avoid the above described problems, and it is possible to suppress the generation of noises and lowering of efficiency during the recording operation, so that it is possible to obtain excellent recording/reproducing characteristics.

A process for forming a magnetic head having $\theta 2$ of about 90° as shown in FIGS. 1 and 2 as an example is as follows.

First, a magnetic film of NiFe or the like, which will be formed as a recording main pole 1, a reproducing main pole 4 and a return yoke 5, is deposited on an alutic substrate 7, which has been coated with alumina, by the sputtering method or the like so as to have a thickness corresponding to a recording track width. Then, a photoresist is applied thereon, and a pattern is formed by exposure and development. This photoresist is used as a mask for etching the magnetic film by the ion milling method. While the photoresist remains, an insulating film of alumina or the like is deposited so as to substantially have the same thickness as that of the magnetic film. Then, the resist is removed to remove (lift off) alumina from the magnetic film.

Moreover, alumina is deposited thereon, and flattened by the chemical mechanical polishing (CMP). At this time, alumina remains so as to have a thickness of tens nm to serves as an insulating film for isolating the main pole and return yoke from a magnetoresistance effect element. The magnetoresistance effect element is deposited thereon, and patterned by a usual photolithography process. Thereafter, a conductive film of Cu or the like is deposited thereon to form a reproducing element electrode and a recording head exciting coil 3 by a photolithography process. Moreover, alumina is deposited thereon to form a magnetic path hole at the center of the patterned coil. Then, a magnetic film of NiFe or the like, which will be formed as a return yoke 2 of a recording head, is deposited to be patterned by a photolithography process. Finally, alumina, which will be formed as a protective film, is deposited to form a through hole for drawing a reproducing lead and a recording coil and to form an electrode (not shown) by plating.

Between the main pole 4 and return yoke 5 of the reproducing head, the side of the medium facing surface may be particularly formed as follows. First, a conductive film of Cu or the like is deposited before a magnetic film is deposited. Thereafter, similar to the above described method, a magnetic film is deposited to be patterned. At this time, nothing has been formed between the main pole 4 and the return yoke 5. After alumina is deposited before the CMP, the magnetic film, together with alumina, is cut at an interval of 0.1 μm or less by the focused ion beam (FIB), and a portion, which has been formed by cutting the magnetic film by the FIB, is filled with a non-magnetic film of Cu or the like by plating. The subsequent steps after the CMP are the same as those in the above described method.

When the magnetic head according to the present invention is thus constructed so that θ2 is about 90°, components can be sequentially stacked on the major surface of the substrate. That is, the magnetic head can be formed without the need of the film application and patterning on the end face of the substrate, so that it is possible to reduce the number or steps and costs.

While the case where θ2 is substantially 90° has been shown in FIGS. 1 and 2 as an example, the present invention should not be limited thereto. If the condition of θ2>θ1 is satisfied, the above described various effects can be obtained.

A modified example of the magnetic head in this preferred embodiment will be described below.

Figure 3:
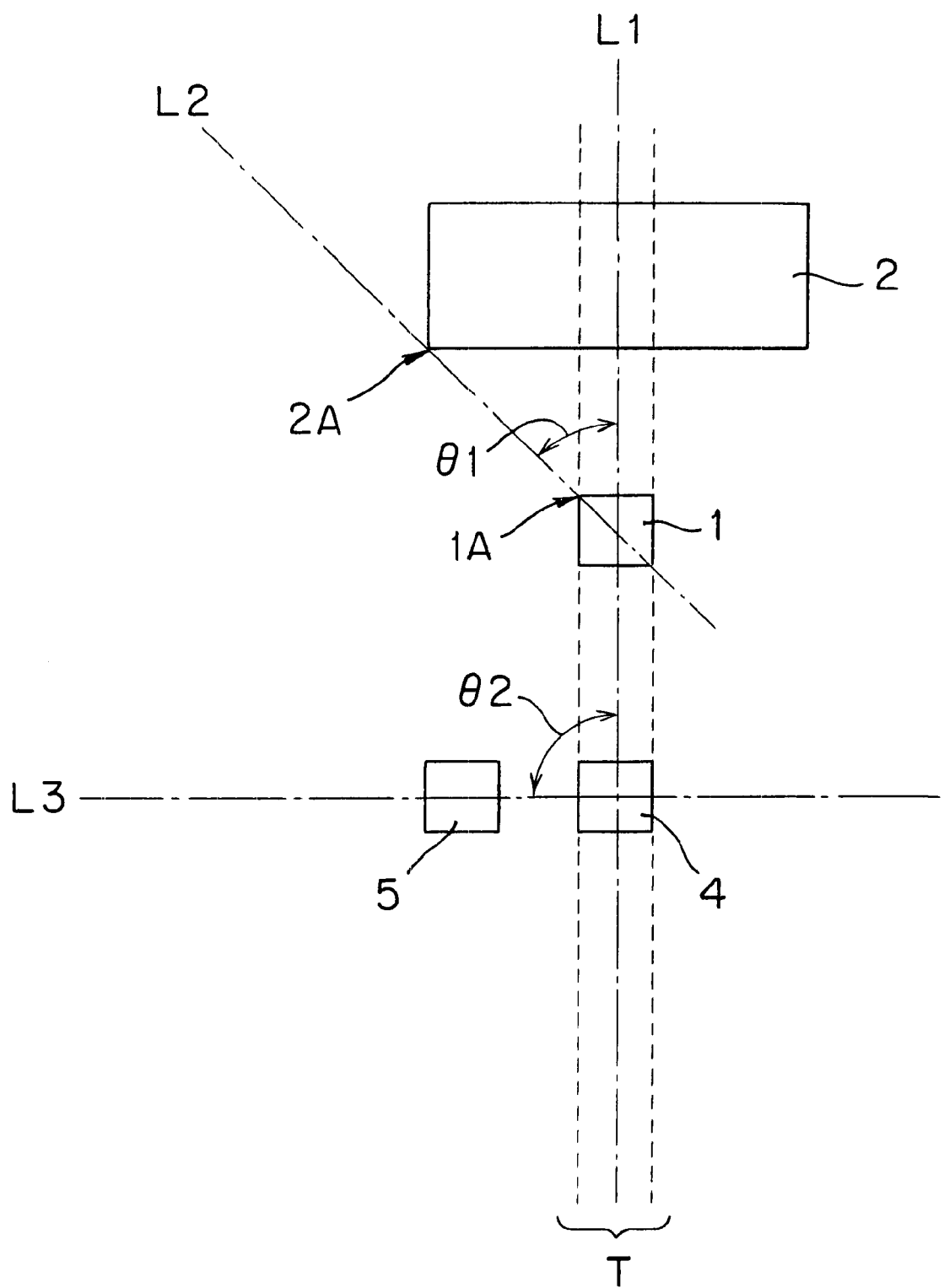
FIG. 3 is a plan view for explaining the positional relationship between a recording head and a reproducing head in a modified example of a magnetic head according to the present invention.

FIG. 3 is a plan view showing the positional relationship between a recording head 8 and a reproducing head 9 in the modified example of this preferred embodiment, which is viewed from the side of a medium facing surface. In this modified example, a main pole 1 and return yoke 2 of the recording head, and a main pole 4 of the reproducing head are arranged along a recording track T.

Also in this modified example, assuming that an angle between a line L1, which is drawn between the center of the main pole 1 of the recording head 8 and the center of the return yoke 2, and a line L2, which is drawn between the facing end portions 1A and 2A of the main pole 1 and return yoke 2, is θ1, and assuming that an angle between the line L1, which is drawn between the center of the main pole 1 of the recording head 8 and the center of the return yoke 2, and a line L3, which is drawn between the center of the main pole 4 of the reproducing head 9 and the center of the return yoke 5, is θ2, the magnetic head is constructed so that θ2>θ1.

Also in this modified example, the direction of magnetic fluxes during a recording operation can be shifted from that during a reproducing operation by limiting the relationship between the arrangements of the recording head and the reproducing head to the above described range. As a result, it is possible to avoid the above described problems, and it is possible to suppress the generation of noises and lowering of efficiency during the recording operation, so that it is possible to obtain excellent recording/reproducing characteristics.

(Second Preferred Embodiment)

As the second preferred embodiment of the present invention, an embodiment wherein a magnetic head according to the present invention is used for a vertical recording medium having a double-layer construction will be described below.

Figure 4:
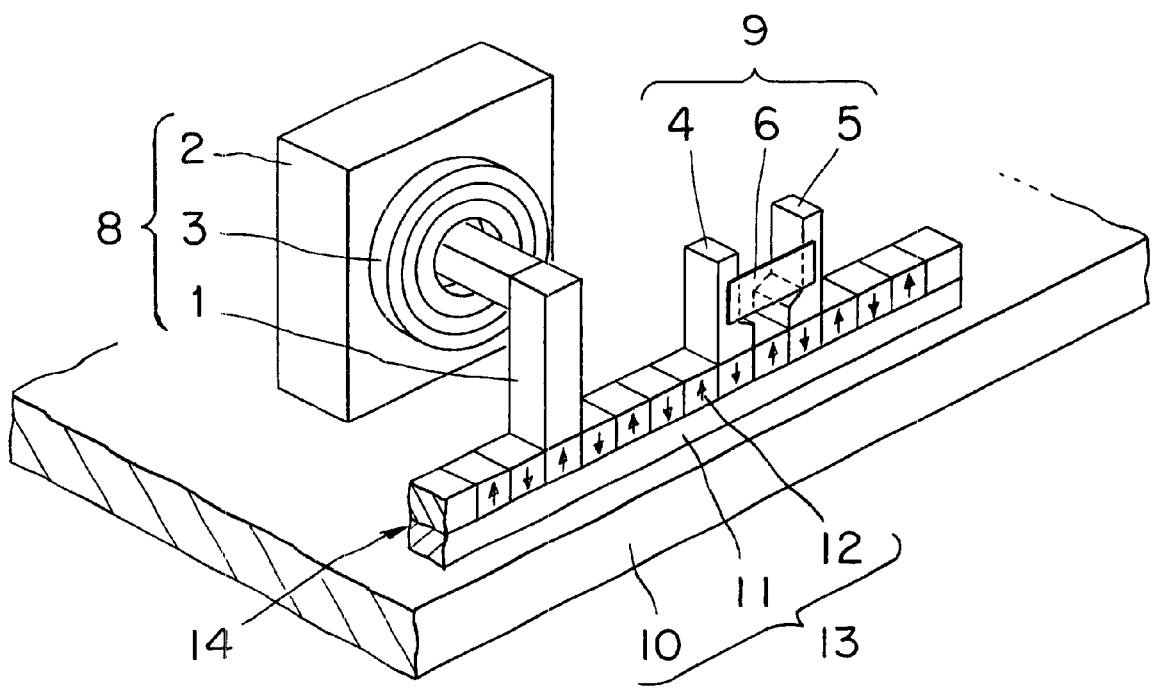
FIG. 4 is a perspective view showing the positional relationship between a track on a medium disk and the second preferred embodiment of a magnetic head for vertical magnetic recording according to the present invention.

FIG. 4 is a perspective view showing the construction of a principal part of a magnetic head for a vertical magnetic recording and magnetic recording medium in this preferred embodiment. That is, this figure shows a state that a recording head 8 and a reproducing head 9 are arranged on a medium disk 13. The medium disk 13 has a double-layer construction wherein a magnetically soft backing layer 11 and a vertical recording layer 12 are stacked on a medium substrate 10. On the medium disk 13, a recording track 14 is formed. The reproducing head 9 is arranged so that a line drawn between the center of its main pole 4 and the center of its return yoke 5 is substantially parallel to the recording track 14. On the other hand, the recording head 8 is arranged so that a line drawn between its main pole 1 and the center of its return yoke 2 is substantially perpendicular to the track 14. That is, during a recording operation, a magnetic circuit formed by the main pole 1 and return yoke 2 is perpendicular to the recording track 14. On the other hand, during a reproducing operation, a magnetic circuit formed by the main pole 4 and return yoke 5 is parallel to the recording track 14. Therefore, as described above with respect to the first preferred embodiment, it is possible to suppress the generation of noises and lowering of efficiency during the recording operation, so that it is possible to obtain excellent recording/reproducing characteristics.

Moreover, according to this preferred embodiment, it is possible to efficiently form a magnetic circuit by using the recording medium having the double-layer construction wherein the magnetically soft backing layer 11 and the vertical recording layer 12 are stacked.

Figure 5A:
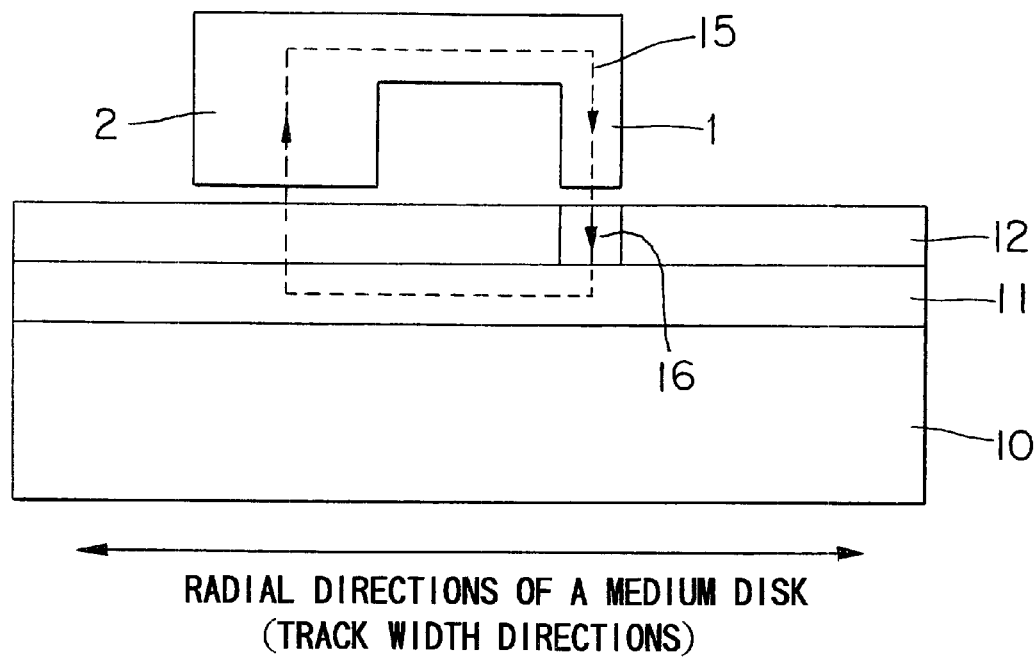
FIGS. 5A and 5B are sectional views showing the flow of magnetic fluxes during recording and reproducing operations in the second preferred embodiment of a magnetic head for vertical magnetic recording according to the present invention according to the present invention.
Figure 5B:
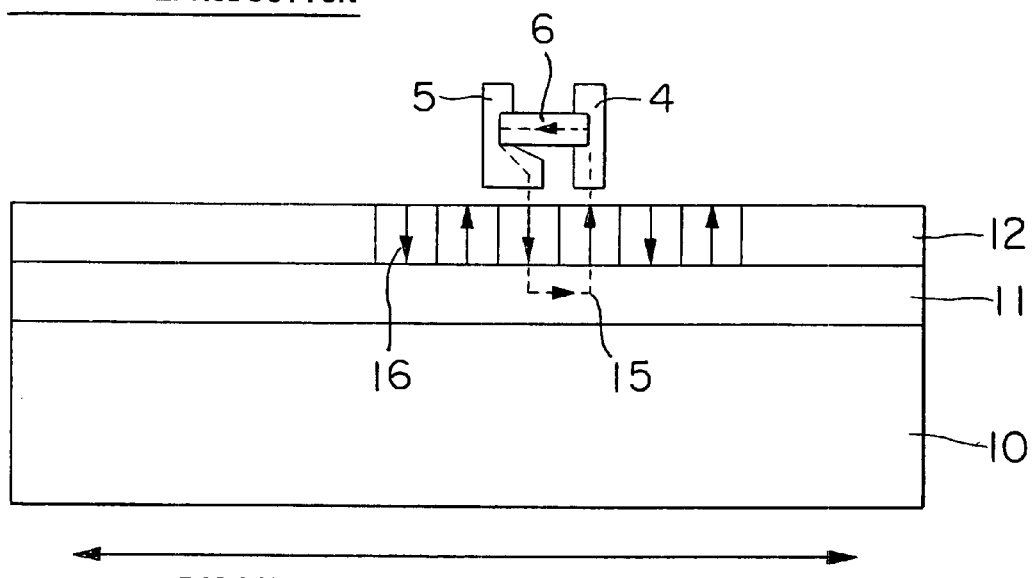

FIGS. 5A and 5B are sectional views showing a magnetic circuit in this preferred embodiment during recording and reproducing operations. As shown in FIG. 5A, during a recording operation, magnetic fluxes focusing on the main pole 1 of the recording head pass through the magnetically soft backing layer 11 to return to the return yoke 2 to form a magnetic circuit, so that the recording efficiency is improved. As shown in FIG. 5B, during a reproducing operation, magnetic fluxes from a recording bit recorded on the recording layer 12 are sucked into the magnetic pole 4 of the reproducing head to pass through the magnetoresistance effect element 6 serving as a sensor, the return yoke 5 and the backing layer 11 to return to the recording bit to form a magnetic circuit, so that it is possible to efficiently carry out the reproducing operation.

The concrete constructions of the respective parts will be described as an example. The recording head 8 comprises a recording main pole 1 of a magnetic material such as NiFe, an exciting coil 3 of a conductive material such as Cu, and a return yoke 2 of a magnetic material such as NiFe, which is connected to the recording main pole 1 via a magnetic path hole.

The reproducing head 9 comprises a reproducing main pole 4 of a magnetic material such as NiFe, a reproducing return yoke 5, a magnetoresistance effect element 6 which is arranged so as to construct a bridge therebetween, and leads (not shown) of a conductive material such as Cu, which are arranged on both sides of the magnetoresistance effect element 6 in order to supply a sense current to the magnetoresistance effect element 6.

As concrete sizes, in order to obtain a plane recording density of 100 Gbpsi (gigabit per square inch), the track density was set to be 100 kTPI (kilo-track per inch), and the track recording density was set to be 1000 kBPI (kilo-bit per inch). In this case, the track width was about 0.2 μm, and the bit length was about 0.03 μm. Therefore, the distance between the main pole and return yoke of the reproducing head 9 was at least about 0.2 μm assuming that its direction is the directions of the track width, whereas the distance is about 0.03 μm in the case of the directions of the bit length, i.e., the longitudinal directions of the track, so that the distance may be a smaller value by one place. Therefore, since the length of the magnetic circuit is small even if the bit size is small and the quantity of generated magnetic fluxes is small, the magnetoresistance is small, and the quantity of leakage magnetic fluxes decreases, so that it is possible to obtain a sufficient efficiency.

(Third Preferred Embodiment)

As the third preferred embodiment of the present invention, a construction wherein the main pole of a recording head also serves as the main pole of a reproducing head will be described below.

Figure 6A:
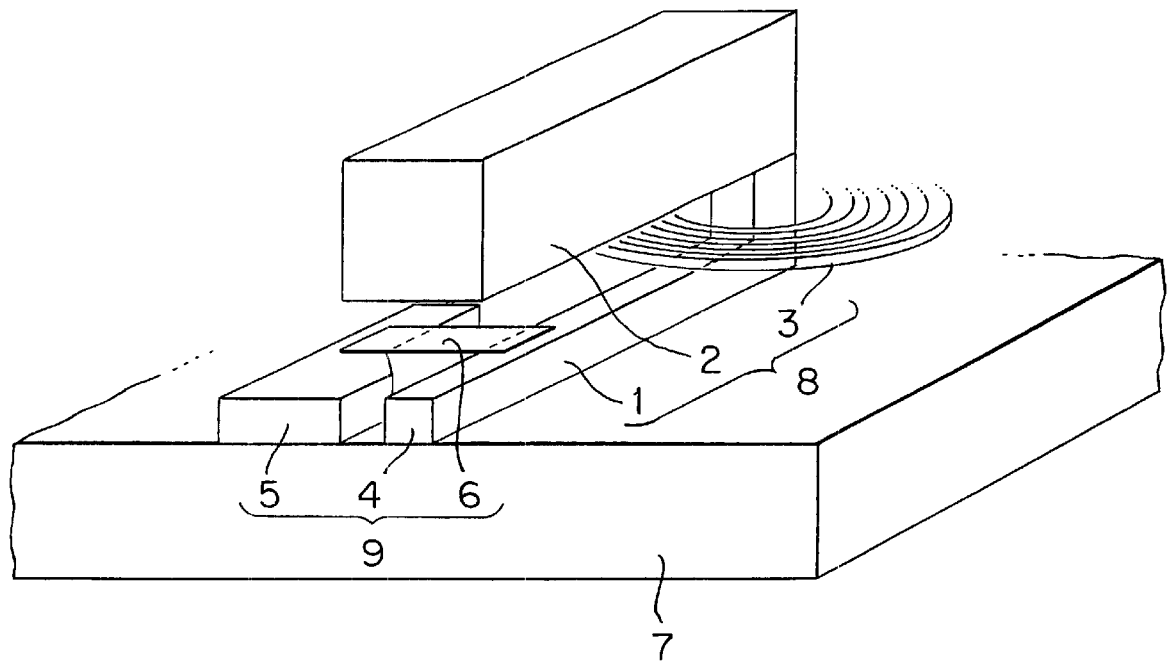
FIG. 6A is a perspective view of the third preferred embodiment of a magnetic head for vertical magnetic recording according to the present invention, which is viewed from a medium facing surface.
Figure 6B:
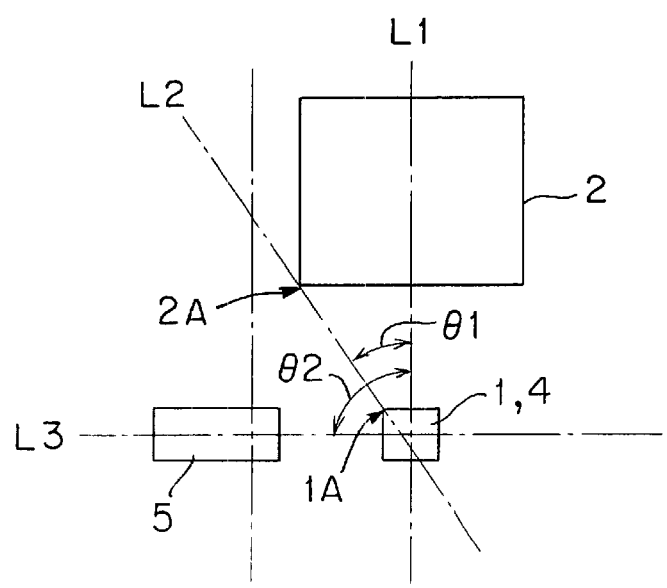
FIG. 6B is a plan view of the magnetic head viewed from the medium facing surface.

FIG. 6A is a perspective view of a magnetic head for vertical magnetic recording in this preferred embodiment, which is viewed from a medium facing surface, and FIG. 6B is a plan view of the magnetic head, which is viewed from the medium facing surface.

A recording head 8 and a reproducing head 9 are formed on an alutic substrate 7 coated with alumina. The recording head 8 comprises a recording main pole 1 of a magnetic material such as NiFe, an exciting coil 3 of a conductive material such as Cu, and a return yoke 2 of a magnetic material such as NiFe, which is connected to the recording main pole 1 via a magnetic path hole.

The reproducing head 9 comprises a reproducing main pole 4 which also serves as the main pole 1 of the recording head 8, a reproducing return yoke 5, a magnetoresistance effect element 6 which is arranged so as to construct a bridge therebetween, and leads (not shown) of a conductive material such as Cu, which are arranged on both sides of the magnetoresistance effect element 6 in order to supply a sense current to the magnetoresistance effect element 6.

As shown in FIG. 6B, assuming that an angle between a line L1, which is drawn between the center of the main pole 1 of the recording head 8 and the center of the return yoke 2, and a line L2, which is drawn between the end portion of the main pole 1 and the end portion of the return yoke 2, is $\theta1$, and assuming that an angle between the line L1, which is drawn between the center of the main pole 1 of the recording head 8 and the center of the return yoke 2, and a line L3, which is drawn between the center of the main pole 4 of the reproducing head 9 and the center of the return yoke 5, is $\theta2$, the magnetic head is constructed so that $\theta2>\theta1$ and $\theta2$ is substantially 90°.

Therefore, as described above with respect to the first preferred embodiment, it is possible to suppress the generation of noises and lowering of efficiency during the recording operation, so that it is possible to obtain excellent recording/reproducing characteristics.

Moreover, in this preferred embodiment, the main pole 1 of the recording head also serves as the main pole 4 of the reproducing head. As a result, the "shift" of the track position does not occur at any place from the inner peripheral portion of the medium disk 13 to the outer peripheral portion thereof between during the recording operation and during the reproducing operation. Therefore, it is not required to take a largish recording track width, so that it is possible to reduce the track pitch.

(Fourth Preferred Embodiment)

As the fourth preferred embodiment of the present invention, a magnetic head wherein a recording head and a reproducing head are arranged so as to face downwards to face the surface of a substrate will be described below.

Figure 7:
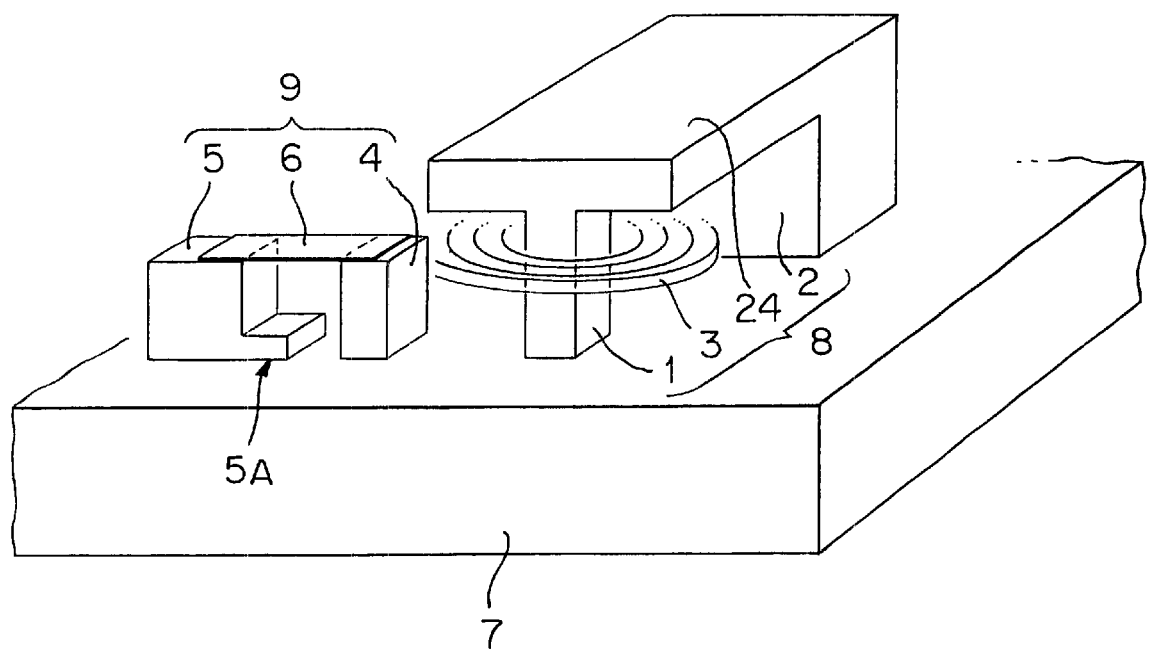
FIG. 7 is a perspective view showing the construction of a principal part of the fourth preferred embodiment of a magnetic head according to the present invention.

FIG. 7 is a conceptual drawing showing the construction of a magnetic head for vertical magnetic recording in this preferred embodiment. That is, a recording head 8 and a reproducing head 9 are formed so as to face downwards to face the substrate surface of a thermally oxidized silicon substrate 7.

The recording head 8 comprises a recording main pole 1 of a magnetic material such as NiFe or CoFe—$Al_2O_3$, an exciting coil 3 of a conductive material such as Cu, and a return yoke 2 of a magnetic material such as NiFe or CoFe—$Al_2O_3$, which is connected to the recording main pole 1 via an auxiliary magnetic pole 24.

The reproducing head 9 comprises a reproducing main pole 4 of a magnetic material such as NiFe or CoFe—$Al_2O_3$, a reproducing return yoke 5, a magnetoresistance effect element 6 which is arranged so as to construct a bridge therebetween, and leads (not shown) of a conductive material such as Cu, which are arranged on both sides of the magnetoresistance effect element 6 in order to supply a sense current to the magnetoresistance effect element 6.

In FIG. 7, the recording head 8 and the reproducing head 9 are shown so as to be formed on the major surface of the substrate 7 for convenience. In fact, the recording head 8 and the reproducing head 9 may be embedded in the substrate, and the tip portions of the main poles 1, 4 and the return yokes 2, 5 may be formed in the vicinity of the medium facing surface.

One feature of this preferred embodiment is that the magnetic poles 1, 4 and the return yokes 2, 5 are formed so as to be substantially perpendicular to the major surface of the substrate 7.

A method for forming such a magnetic head is as follows.

First, an underlying film (not shown) of a metal such as Cu is deposited on a thermally oxidized silicon film 7. A magnetic film of NiFe or CoFe—$Al_2O_3$, which will be formed as a recording main pole 1, a recording return yoke 2, a reproducing main pole 4 and a reproducing return yoke 5, is deposited thereon by the sputtering method so as to have a thickness corresponding to a thin L-shaped bent portion 5A of the tip portion of the reproducing return yoke 5. Then, a photoresist is applied thereon, and a pattern for leaving a space between the reproducing main pole 4 and the reproducing return yoke 5 is formed by exposure and development. This photoresist is used as a mask for etching the magnetic film by the ion milling method or the reactive ion etching (RIE) method. The space between the main pole 4 and return yoke 5 of the reproducing head may be formed by the FIB.

Then, this space is filled with Cu by the plating method. After the resist is removed, a magnetic film is stacked thereon, and a photoresist is applied thereon to form a pattern by exposure and development. This photoresist is used as a mask for etching the magnetic film by the ion milling method or the reactive ion etching (RIE) method. While the photoresist remains, an insulating film of alumina or the like is deposited so as to substantially have the same thickness as that of the magnetic film. Then, the resist is removed to remove (lift off) alumina from the magnetic film.

Moreover, alumina is deposited thereon, and flattened by the CMP. At this time, alumina remains so as to have a thickness of tens nm to serves as an insulating film for isolating the reproducing main pole and return yoke from a magnetoresistance effect element. The magnetoresistance effect element is deposited thereon, and patterned by a usual photolithography process. Thereafter, a conductive film of Cu or the like is deposited thereon to form a reproducing element electrode and a recording head exciting coil 3 by a photolithography process. Moreover, alumina is deposited thereon to form a magnetic path hole at the center of the patterned coil and on the recording return yoke 2. Then, a magnetic film of NiFe or the like, which will be formed as an auxiliary magnetic pole 24 of the recording head, is deposited to be patterned by a photolithography process. Then, alumina, which will be formed as a protective film, is deposited to form a through hole for drawing an electrode for a reproducing lead and a recording coil and to form an electrode (not shown) by plating.

Finally, the overcoat of alumina is applied thereon, and the head portion of the electrode portion is exposed to the outside to form a gold pad thereon. Then, the thermally oxidized silicon substrate 7 and the underlying film are removed by the wet etching method to expose the medium facing surface of the magnetic head.

If a magnetic head according to the present invention is thus constructed, it is possible to form the magnetic head without the need of the film application and patterning on the end face of the substrate, so that it is possible to reduce the number or steps and costs. Moreover, if this head is used for recording/reproducing on a vertical magnetic recording medium comprising a magnetically soft backing layer and a vertical recording layer, it is possible to suppress the generation of noises and lowering of efficiency during the recording operation, so that it is possible to obtain excellent recording/reproducing characteristics.

(Fifth Preferred Embodiment)

As the fifth preferred embodiment of the present invention, a magnetic recording and reproducing system including a magnetic head according to the present invention will be described below. The magnetic head according to the present invention, which has been described referring to FIGS. 1 through 7, can be incorporated into a recording and reproducing magnetic head assembly to be mounted in a magnetic recording and reproducing system.

Figure 8:
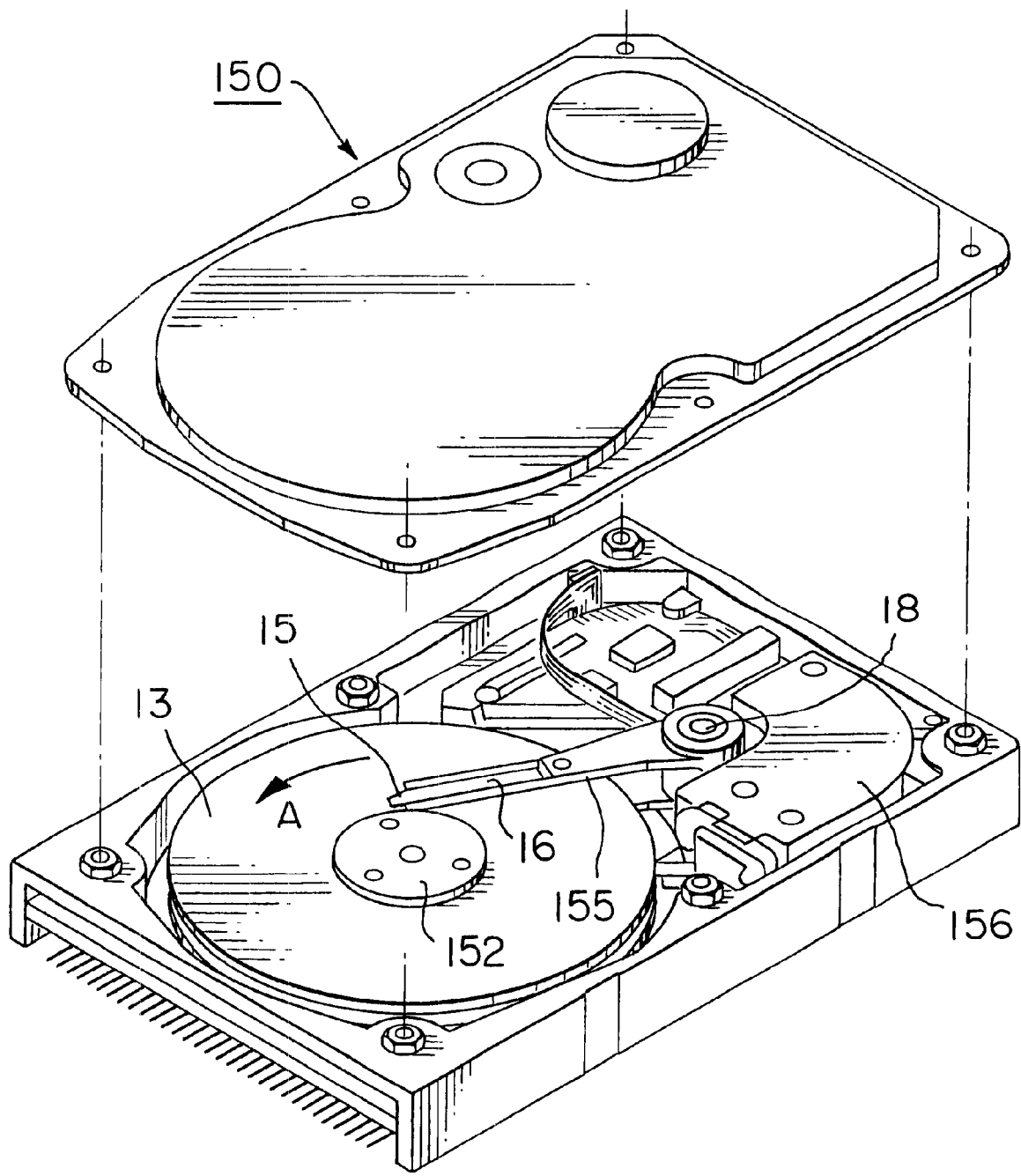
FIG. 8 is a conceptual drawing showing the schematic construction of the fifth preferred embodiment of a magnetic recording and/or reproducing system according to the present invention.

FIG. 8 is a perspective view of the schematic construction of an example of a principal part of such a magnetic recording system. That is, a magnetic recording and reproducing system 150 according to the present invention uses a rotary actuator. In this figure, a vertical recording medium disk 13 is mounted on a spindle 18, and rotatable in a direction of arrow A by means of a motor (not shown) in response to a control signal from a drive unit control part (not shown). A head slider 15 for recording/reproducing information, which is to be stored in the medium disk 13, is mounted on the tip portion of a thin-film-like suspension 16. For example, the magnetic head in any one of the above described preferred embodiments is mounted on the head slider 15 in the vicinity of its tip.

When the medium disk 13 rotates, the medium facing surface (ABS) of the head slider 15 is held at a predetermined floating amount from the surface of the medium disk 13.

The suspension 16 is connected to one end of an actuator arm 155 having a bobbin portion for holding a driving coil (not shown) or the like. The other end of the actuator arm 155 is provided with a voice coil motor 156 which is a kind of linear motor. The voice coil motor 156 comprises a driving coil (not shown) wound onto the bobbin portion of the actuator arm 155, and a magnetic circuit comprising a permanent magnet and a facing yoke which are arranged so as to surround the driving coil while facing the driving coil.

The actuator arm 155 is held by two ball bearings (not shown) which are provided above and below the spindle 18, and rotatable and slidable by the voice coil motor 156.

Figure 9:
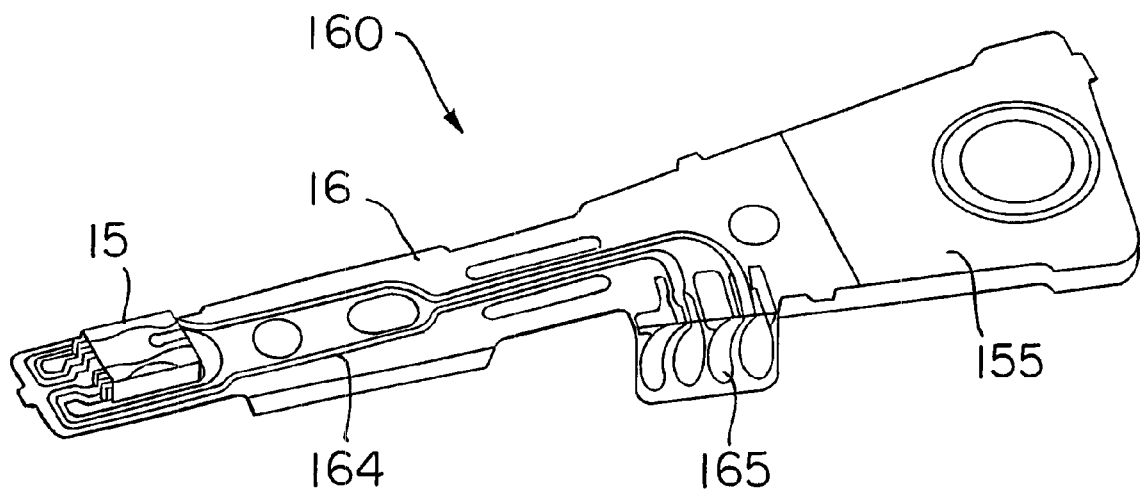
FIG. 9 is an enlarged perspective view of a magnetic head assembly in front of an actuator arm 155, which is viewed from the side of a disk.

FIG. 9 is an enlarged perspective view of a magnetic head assembly in front of the actuator arm 155, which is viewed from the side of a disk. That is, the magnetic head assembly 160 has the actuator arm 155 having the bobbin portion for holding the driving coil, and one end of the actuator arm 155 is connected to the suspension 16.

On the tip portion of the suspension 16, the head slider 15 having any one of the magnetic heads described above referring to FIGS. 1 through 7 is mounted. The suspension 16 has a writing/reading lead wire 164. This lead wire 164 is electrically connected to each of the electrodes of the magnetic head provided in the head slider 15. In the figure, reference number 165 denotes an electrode pad of the magnetic head assembly 160.

The above described magnetic recording and reproducing system may have a plurality of medium disks.

Figure 10:
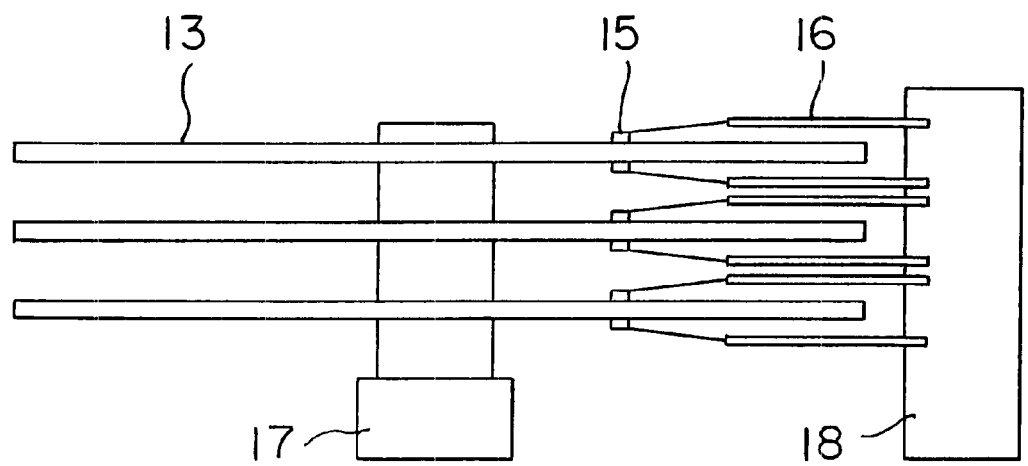
FIG. 10 is a conceptual drawing showing the schematic construction of a principal part of a magnetic recording and reproducing system having a plurality of medium disks.

FIG. 10 is a conceptual drawing showing the construction of a principal part of a magnetic recording and reproducing system having a plurality of medium disks. That is, the magnetic recording and reproducing system in this figure comprises a slider 15, on which any one of the above described magnetic heads in the first through fourth preferred embodiments is mounted, a suspension 16 for supporting thereon the slider 15, a spindle 18, a medium disk 13 and a medium driving part 17. While FIG. 10 shows a construction wherein the slider 15 is provided on both sides of each of three medium disks 13, the present invention should not be limited thereto, but the numbers of medium disks and sliders may be suitably determined.

Figure 11:
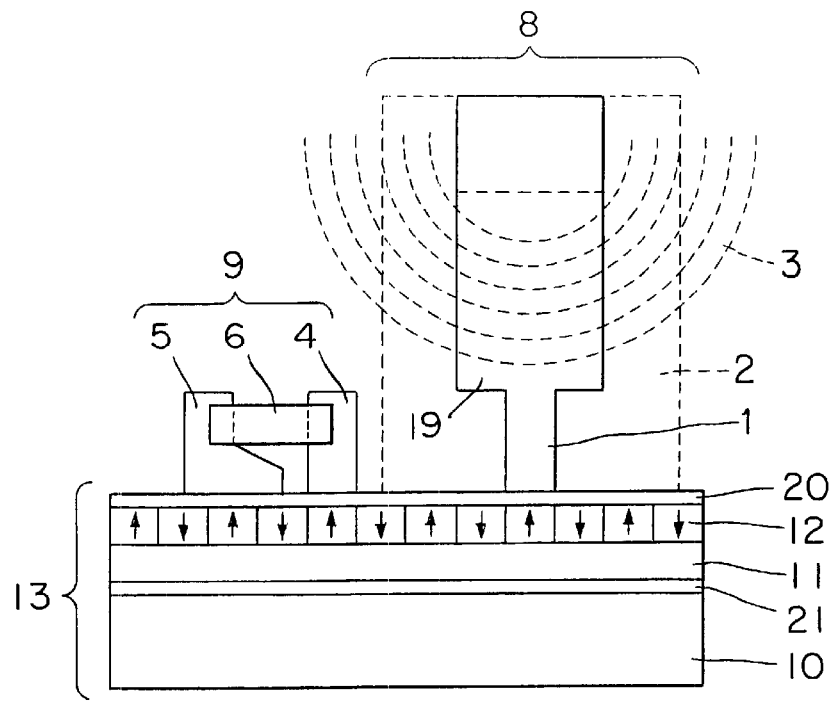
FIG. 11 is an enlarged sectional view showing the schematic constructions of a magnetic head portion and a medium disk portion in the fifth preferred embodiment of a magnetic recording and/or reproducing system according to the present invention.

FIG. 11 is an enlarged sectional view of a principal part of a magnetic head portion, which is mounted on a slider 15, and a medium disk which faces the magnetic head portion. The medium disk 13 comprises a glass substrate 10, an underlying film 21 of a non-magnetic metal such as Ta, a backing layer 11 of a magnetically soft film of CoZrNb or the like, a recording layer 12 of CoCr or the like, and a protective layer 20 of CoZrNb or the like. The underlying film 21 is provided in order to improve the crystal orientation characteristics of the backing layer 11 and recording layer 12 which are formed on the underlying film 21. The protective film 20 is provided in order to prevent the slider 15 and the medium disk 13 from being deteriorated due to abrasion.

In a recording operation on the recording layer 12, current is passed through the coil 3 of the recording head 8 to generate magnetic fluxes which are introduced into the main pole 1 by the auxiliary pole 19 and simultaneously focused to enhance the magnetic field strength of the tip of the main pole to carry out writing. At this time, the magnetic fluxes passing through the recording layer 12 passes through the backing layer 11 to return to the return yoke 2 to be connected to the auxiliary pole 19 to form a magnetic circuit.

In a reproducing operation, magnetic fluxes from a recording bit recorded on the recording layer 12 are sucked into the main pole 4 of the reproducing head to pass through the magnetoresistance effect element 6 serving as a sensor, the return yoke 5 and the backing layer 11 to return to the recording bit to form a magnetic circuit. A regenerative signal is detected as the variation in resistance when a magnetic flux pass through the magnetoresistance effect element 6.

(Sixth Preferred Embodiment)

As the sixth preferred embodiment of the present invention, a magnetic recording and reproducing system using a magnetic head according to the present invention and a vertical recording medium having a triple-layer construction will be described below.

Figure 12:
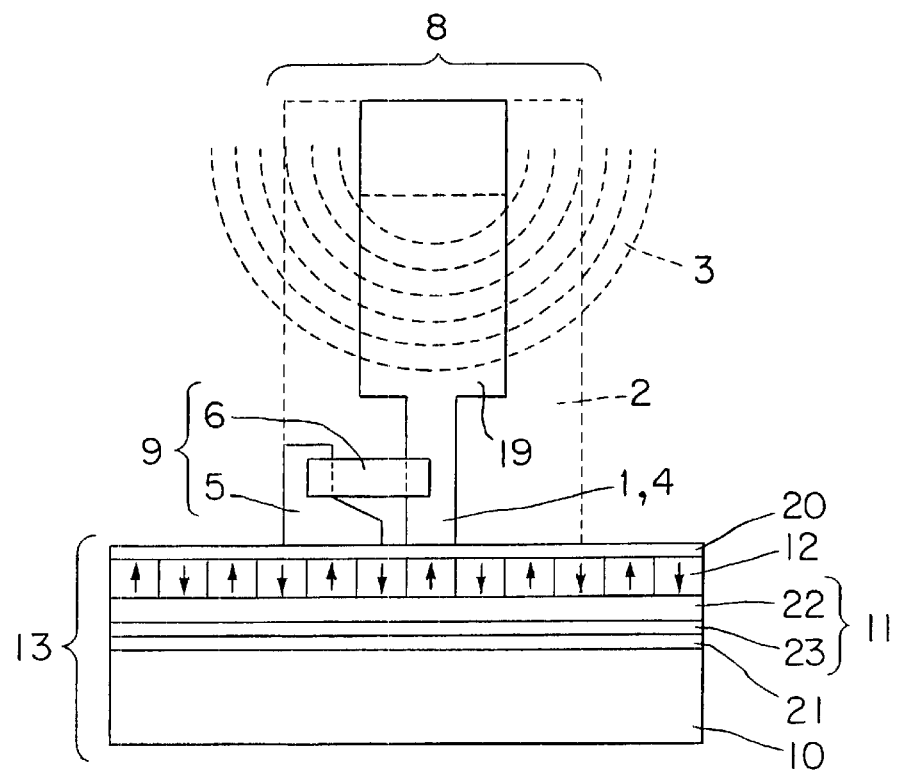
FIG. 12 is an enlarged sectional view showing the schematic constructions of a magnetic head portion and a medium disk portion in the sixth preferred embodiment of a magnetic recording and reproducing system according to the present invention.

FIG. 12 is an enlarged sectional view showing a magnetic head portion and a medium disk 13 facing the magnetic head portion in a magnetic recording and reproducing system in this preferred embodiment. The medium disk 13 in this preferred embodiment comprises a glass substrate 10, an underlying film 21 of a non-magnetic metal such as Ta, a backing layer 11 of a double-layer film comprising an antiferromagnetic film 23 of PtMn or the like and a magnetically soft film 22 of NiFe or the like, a recording layer 12 of CoCr or the like, and a protective layer 20 of C or the like. That is, the principal part of the medium disk 13 has a "triple-layer construction" wherein the antiferromagnetic film 23, the magnetically soft film 22 and the recording layer 12 are stacked up.

The underlying film 21 is provided in order to improve the crystal orientation characteristics of the backing layer 11 and recording layer 12 which are formed on the underlying film 21. The protective layer 20 is provided in order to prevent the slider 15 and the medium disk 13 from being deteriorated due to abrasion.

In a recording operation on the recording layer 12, current is passed through the coil 3 of the recording head 8 to generate magnetic fluxes which are introduced into the main pole 1 by the auxiliary pole 19 and simultaneously focused to enhance the magnetic field strength of the tip of the main pole to carry out writing. At this time, the magnetic fluxes passing through the recording layer passes through the backing layer 11 to return to the return yoke 2 to be connected to the auxiliary pole 19 to form a magnetic circuit. In a reproducing operation, magnetic fluxes from a recording bit recorded on the recording layer 12 are sucked into the main pole 4 of the reproducing head to pass through the magnetoresistance effect element 6 serving as a sensor, the return yoke 5 and the backing layer 11 to return to the recording bit to form a magnetic circuit. A regenerative signal is detected as the variation in resistance when a magnetic flux pass through the magnetoresistance effect element 6.

In the magnetic head in this preferred embodiment, the main pole 1 of the recording head also serves as the main pole 4 of the reproducing head, so that it is possible to carry out recording and reproducing operations without the shift of the track position at any place from the inner peripheral portion of the medium disk 13 to the outer peripheral portion thereof. In addition, since the double-layer film comprising the antiferromagnetic film 23 and the magnetically soft film 22 is used, it is possible to effectively carry out recording and reproducing operations without the occurrence of noises due to the backing layer.

Moreover, in this preferred embodiment, it is possible to form a more excellent magnetic recording and reproducing system by using the stacked film comprising the antiferromagnetic film 23 and the magnetically soft film 22 as the backing film 11. That is, when the magnetic head according to the present invention, the direction of magnetic fluxes flowing through the magnetically soft backing layer during a recording operation is different from that during a reproducing operation. If the magnetically soft backing layer has a magnetic anisotropy, the magnetic permeability varies in accordance with direction, so that efficiency drops during any one of recording and reproducing operations. If a magnetic domain wall is produced on the magnetically soft backing layer, noises are generated when the magnetic head pass through the magnetic domain wall. Also, if the magnetic domain wall of the magnetically soft backing layer is moved by a disturbance magnetic field generated from a head positioning or disk rotating motor, noises are generated. Therefore, it is desired to provide a film which is a magnetically isotropic film wherein no magnetic domain wall is produced on the magnetically soft backing layer.

On the other hand, in this preferred embodiment, by using the stacked film comprising the antiferromagnetic film 23 and the magnetically soft film 22 as the backing film 11, it is possible to suppress magnetic domain walls from being produced by the switched connection between the antiferromagnetic film 23 and the magnetically soft film 22, and it is possible to provide a magnetically isotropic film. It is possible to obtain a film having such characteristics by applying a rotating magnetic field during the deposition of the antiferromagnetic film and magnetically soft film or by carrying out a thermal treatment in a rotating magnetic field after the deposition. Therefore, the magnetic recording and reproducing system, which is combined with the medium having the triple-layer construction wherein the magnetic head according to the present invention, the antiferromagnetic film 23 and the magnetically soft film 22 are used as the backing layer, is an excellent magnetic recording and reproducing system wherein the influence of noises is suppressed even if the recording density increases.

While the preferred embodiments of the present invention have been described above, the present invention should not be limited thereto. For example, the shapes and materials of the magnetic poles and return yokes of the recording head and reproducing head may be suitably selected from a range, which is well known by persons skilled in the art, to similarly carry out the present invention to obtain the same advantages.

The vertical magnetic recording system for use in the present invention should not be limited to a system wherein the magnetizing direction of the recording bit is precisely perpendicular to the major surface of the recording medium. That is, even if the magnetizing direction of the recording bit is inclined from the perpendicular direction to some extent, it can be applied to the present invention to obtain the same advantages.

Moreover, the magnetic recording and reproducing system according to the present invention may be a so-call fixed type system which always has specific recording medium, or a so-called "removable" type system capable of replacing recording medium.

All of other magnetic heads and magnetic recording and reproducing systems, which can be suitably design-changed by persons skilled in the art on the basis of the above described magnetic head and magnetic recording and reproducing system in the preferred embodiments of the present invention in order to carry out the present invention, should belong to the scope of the present invention.

As described above, by using the magnetic head according to the present invention, it is possible to suppress noises from being generated due to the magnetically soft backing layer during a recording operation, and it is possible to efficiently carry out recording and reproducing operations.

According to the magnetic recording and reproducing system of the present invention, it is possible to carry out an efficient vertical magnetic recording/reproducing operation in which a small quantity of noises are generated, so that it is possible to provide great industrial merits.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A magnetic head, comprising:
    a recording head comprising a first main pole and a first return yoke, the first main pole having a first medium facing portion, the first return yoke having a second medium facing portion, the first and second medium facing portions are disposed with a first magnetic gap therebetween, and
    a reproducing head comprising a second main pole and a second return yoke, the second main pole having a third medium facing portion, the second return yoke having a fourth medium facing portion, the third and fourth medium facing portions are disposed with a second magnetic gap therebetween, a first angle θ1 between positive directions of first and second straight lines being smaller than a second angle θ2 between positive directions of the first straight line and a third straight line, the first straight line connecting centers of medium facing surfaces of the first medium facing portion and the second medium facing portion, the positive direction of the first straight line being a direction heading from the center of medium facing surface of the first medium facing portion to the center of medium facing surface of the second medium facing portion, the second straight line connecting opposing corners of medium facing surfaces of the first medium facing portion and the second medium facing portion, the positive direction of the second straight line being a direction heading from the opposing corner of the medium facing surface of the first medium facing portion to the opposing corner of the medium facing surface of the second medium facing portion, the third straight line connecting centers of medium facing surfaces of the third medium facing portion and the fourth medium facing portion, and the positive direction of the third straight line being a direction heading from the center of medium facing surface of the third medium facing portion to the center of medium facing surface of the fourth medium facing portion.

2. A magnetic head as set forth in claim 1, wherein the θ2 is substantially 90°.

3. A magnetic head as set forth in claim 1, wherein the third straight line is substantially parallel to a longitudinal direction of a recording track of a recording medium.

4. A magnetic head as set forth in claim 1, wherein the recording head produces a vertical magnetic signal whose magnetic field direction is vertical to a medium facing surface of the magnetic head.

5. A magnetic head as set forth in claim 1, wherein the recording head has a recording coil, and the first main pole or the first return yoke has a portion disposed inside of the recording coil.

6. A magnetic head as set forth in claim 1, wherein the reproducing head has a magnetoresistance effect film disposed on the second main pole and/or the second return yoke.

7. A magnetic head as set forth in claim 6, wherein the magnetoresistance effect film has a first ferromagnetic layer having substantially free magnetization, a nonmagnetic layer disposed on the first ferromagnetic layer, a second ferromagnetic layer disposed on the nonmagnetic layer and having substantially fixed magnetization.

8. A magnetic head as set forth in claim 7, further comprising a pair of electrodes coupled with the magnetoresistance effect film, the pair of the electrodes are disposed on opposite film surfaces of the magnetoresistance effect film.

9. A magnetic head as set forth in claim 7, further comprising a pair of electrodes coupled with the magnetoresistance effect film, the pair of the electrodes are disposed on side edges of the magnetoresistance effect film.

10. A magnetic recording and reproducing system, comprising a magnetic head having a recording head and a reproducing head, the recording head comprising a first main pole and a first return yoke, the first main pole having a first medium facing portion, the first return yoke having a second medium facing portion, the first and second medium facing portions are disposed with a first magnetic gap therebetween, the reproducing head comprising a second main pole and a second return yoke, the second main pole having a third medium facing portion, the second return yoke having a fourth medium facing portion, the third and fourth medium facing portions are disposed with a second magnetic gap therebetween, a first angle θ1 between positive directions of first and second straight lines being smaller than a second angle θ2 between positive directions of the first straight line and a third straight line, the first straight line connecting centers of medium facing surfaces of the first medium facing portion and the second medium facing portion, the positive direction of the first straight line being a direction heading from the center of medium facing surface of the first medium facing portion to the center of medium facing surface of the second medium facing portion, the second straight line connecting opposing corners of medium facing surfaces of the first medium facing portion and the second medium facing portion, the positive direction of the second straight line being a direction heading from the opposing corner of the medium facing surface of the first medium facing portion to the opposing corner of the medium facing surface of the second medium facing portion, the third straight line connecting centers of medium facing surfaces of the third medium facing portion and the fourth medium facing portion, and the positive direction of the third straight line being a direction heading from the center of medium facing surface of the third medium facing portion to the center of medium facing surface of the fourth medium facing portion.

11. A magnetic recording and reproducing system of claim 10, further comprising a vertical magnetic recording medium.

12. A magnetic recording and reproducing system of claim 11, wherein the vertical magnetic recording medium comprises a antiferromagnetic film, a magnetically soft film disposed on the antiferromagnetic film, and a vertical recording film disposed on the magnetically soft film.

13. A magnetic recording and reproducing system as set forth in claim 10, wherein the θ2 is substantially 90°.

14. A magnetic recording and reproducing system of claim 10, wherein the third straight line is substantially parallel to a longitudinal direction of a recording track of a recording medium.

15. A magnetic recording and reproducing system as set forth in claim 10, wherein the recording head has a recording coil, and the first main pole or the first return yoke has a portion disposed inside of the recording coil.

16. A magnetic recording and reproducing system as set forth in claim 10, wherein the reproducing head has a magnetoresistance effect film disposed on the second main pole and/or the second return yoke.

17. A magnetic recording and reproducing system as set forth in claim 16, wherein the magnetoresistance effect film has a first ferromagnetic layer having substantially free magnetization, a nonmagnetic layer disposed on the first ferromagnetic layer, a second ferromagnetic layer disposed on the nonmagnetic layer and having substantially fixed magnetization.

18. A magnetic recording and reproducing system as set forth in claim 17, further comprising a pair of electrodes coupled with the magnetoresistance effect film, the pair of the electrodes are disposed on opposite film surfaces of the magnetoresistance effect film.

19. A magnetic recording and reproducing system as set forth in claim 17, further comprising a pair of electrodes coupled with the magnetoresistance effect film, the pair of the electrodes are disposed on side edges of the magnetoresistance effect film.

* * * * *